United States Patent
Murakami et al.

[11] Patent Number: 6,127,466
[45] Date of Patent: Oct. 3, 2000

[54] INJECTION-MOLDED ARTICLE

[75] Inventors: Haruji Murakami, Kawasaki; Takayuki Ishikawa; Kazuhito Kobayashi, both of Fujinomiya, all of Japan

[73] Assignee: Polyplastics Co., Ltd., Japan

[21] Appl. No.: 09/284,839

[22] PCT Filed: Nov. 26, 1997

[86] PCT No.: PCT/JP97/04318

§ 371 Date: Apr. 21, 1999

§ 102(e) Date: Apr. 21, 1999

[87] PCT Pub. No.: WO98/23430

PCT Pub. Date: Jun. 4, 1998

[30] Foreign Application Priority Data

Nov. 29, 1996 [JP] Japan ..................... 8-319000

[51] Int. Cl.[7] ........................................ C08K 3/32
[52] U.S. Cl. .................. 524/127; 524/417; 524/262; 524/264; 524/414; 525/450; 525/451; 525/537; 525/462; 252/299.01; 428/1
[58] Field of Search .................. 525/450, 451, 525/462; 524/537, 417, 414, 264, 262, 127; 428/1; 252/299.01

[56] References Cited

U.S. PATENT DOCUMENTS

| | | | |
|---|---|---|---|
| 4,335,038 | 6/1982 | Thomas | 524/188 |
| 4,532,290 | 7/1985 | Jaquiss et al. | 524/417 |
| 4,626,371 | 12/1986 | Ikenaga et al. | 252/62.54 |
| 5,514,739 | 5/1996 | Aketa et al. | 524/108 |
| 5,679,284 | 10/1997 | Kurita | 252/299.01 |
| 5,922,816 | 7/1999 | Hamilton | 525/446 |

FOREIGN PATENT DOCUMENTS

| | | |
|---|---|---|
| 0 175 535 | 8/1990 | European Pat. Off. |
| 63-36633 | 7/1988 | Japan. |
| 1-190750 | 7/1989 | Japan. |
| 5-70700 | 3/1993 | Japan. |
| 5-112709 | 5/1993 | Japan. |
| 7-179743 | 7/1995 | Japan. |
| 7-196895 | 8/1995 | Japan. |
| 9-193293 | 7/1997 | Japan. |

OTHER PUBLICATIONS

Abstract and claims of Japanese Patent Application No. 300,321/1996, Nov. 12, 1996, "Molded Thermoplastic Resin Article Having Metal Layer Formed on Surface".

*Primary Examiner*—Robert Dawson
*Assistant Examiner*—Kuo-Liang Peng
*Attorney, Agent, or Firm*—Nixon & Vanderhye P.C.

[57] ABSTRACT

To obtain an injection-molded article of a resin composition blended with a thermoplastic resin and a liquid-crystal polymer, which is excellent in mechanical strengths, etc., by forming the liquid-crystal polymer into fibers during molding. The molded article, wherein the liquid-crystal polymer (B) capable of forming an anisotropic molten phase is present in the form of fiber having an average aspect ratio of 6 or higher in a matrix of the thermoplastic resin (A) not forming an anisotropic molten phase, is produced by injection-molding a thermoplastic resin composition obtained by blending 100 parts by weight of a resin component consisting of 99 to 50 parts by weight of the thermoplastic resin (A) not forming an anisotropic molten phase and 1 to 50 parts by weight of the liquid-crystal polymer (B) capable of forming an anisotropic molten phase with 0.01 to 1.0 part by weight of at least one compound (C) selected from the group consisting of phosphoric acid, phosphorous acid and metal salts thereof.

7 Claims, No Drawings

INJECTION-MOLDED ARTICLE

BACKGROUND OF THE INVENTION

1. Technical Field of the Invention

The present invention relates to an injection-molded article of a resin composition blended with a thermoplastic resin not forming an anisotropic molten phase and a liquid-crystal polymer capable of forming the anisotropic molten phase.

2. Background Art

A liquid-crystal polymer (LCP) capable of forming an anisotropic molten phase is a thermoplastic resin having numerous properties such as high strength, high rigidity, high thermal resistance, mold processability. However, it makes a difference in molding shrinkage and mechanical properties between a molecular chain orientation direction and a transverse direction, and further, it has commercial disadvantages such as high cost.

On the other hand, a thermoplastic resin such as polycarbonate resin (PC), not forming an anisotropic molten phase is relatively inexpensive, but there is a disadvantage that it is inferior to the liquid-crystal polyester in the physical properties such as heat resistance and rigidity. Especially, since the resin lacks enough rigidity to use for a thin-film housing, it must be thickened on a design. Therefore, there is a limit in its applicability to recent miniaturization/lightening in the fields of electric, electronic, and communication apparatus.

Many trials have, then, been made to make the most of the advantages of LCP and thermoplastic resin not forming an anisotropic molten phase while making up the disadvantages of both by mixing and using them. However, an injection-molded article of a resin composition obtained by simply blending a thermoplastic resin with a small amount of LCP, cannot utilize the LCP's properties such as high strength, high rigidity, thermal resistance and moldability, and results in remarkable deterioration of the mechanical strength. This is because the exhibition of LCP's high mechanical properties and the like originates from a molecular orientation formed under shear and stretch stresses during melt processing. In the resin composition obtained by simply blending a thermoplastic resin and a small amount of LCP, although molecules are particularly oriented in the vicinity of the surface layer of the molded article, most of LCP, other than the surface layer, are only spherically dispersed in a matrix of the thermoplastic resin and provided with no reinforcing effect. Specifically, it is not until LCP takes the form of fibers inside the molded article that LCP molecules are oriented in the length direction of a fibrous configuration, so that the resin is provided with the reinforcing effect.

Moreover, when the proportion of LCP increases and the thermoplastic resin is reduced, LCP this time becomes a matrix in which the thermoplastic resin is dispersed as islands. Such the resin composition is of little utility value since the advantages of the thermoplastic resin cannot be utilized.

Accordingly, methods of producing a molded article containing fibrous LCP provided with a reinforcing effect have been proposed as described in JP-A 5-70700 and JP-A 5-112709, wherein a molding material is first prepared beforehand by stretching and extruding LCP and a thermoplastic resin such as PC at a temperature at which both are molten so that LCP is present as fibers having a high aspect ratio, and then, during molding to form the molded article, the molding material is molded at a temperature at which LCP fails to be molten and only the thermoplastic resin such as PC is molten.

In these methods, however, LCP is stretched and extruded in advance to be oriented as fibers. Alternatively, to form the molded article without any preparation, LCP needs to be formed into fibers by applying a considerable shearing force when a mold is filled up with the resin composition.

The former case supposedly results in deteriorated fluidity and limited molding conditions. In the latter case, there are a remarkable influence of the molded article's shape and a possibility of insufficient strength due to partially insufficient fibrous forming.

Further, JP-A 7-179743 discloses a blending of phosphoric ester. However, since phosphoric ester has a relatively high material cost and needs a relatively large amount when blending, a further effective additive has been requested for.

Moreover, in JP-A 1-190750, phosphoric acid, phosphorous acid and phosphoric ester are mentioned as antioxidants, but specifically only barium stearate is blended.

DISCLOSURE OF THE INVENTION

SUMMARY OF THE INVENTION

As a result of intensive studies and examinations for the purpose of obtaining a composition having excellent properties for a molding material in consideration of the problems described above, the present inventors have found that, by adding at least one compound selected from the group consisting of phosphoric acid, phosphorous acid, and metal salts thereof to a resin component comprising a thermoplastic resin and LCP, and injection-molding the resultant mixture, LCP is easily formed into fibers in a molded article, a much higher reinforcing effect than ever before is shown, and therefore, the molded article having distinguished properties, especially an excellent mechanical strength, can be obtained. Thus, the inventors have completed the present invention. The great characteristic of the present invention is in that the use of phosphoric acid, phosphorous acid and metal salts thereof less expensive than phosphorus compounds heretofore used, and in that even a very small amount of LCP can effectively be formed into fibers, and further, the mechanical strength can also be improved.

That is, the present invention relates to an injection-molded article, characterized in that a liquid-crystal polymer (B) capable of forming the anisotropic molten phase is present in the state of fibers having an average aspect ratio of 6 or more in a matrix of a thermoplastic resin (A) not forming the anisotropic molten phase, by injection-molding a thermoplastic resin composition obtained by blending 100 parts by weight of a resin component consisting of 99 to 50 parts by weight of a thermoplastic resin (A) not forming an anisotropic molten phase and 1 to 50 parts by weight of a liquid-crystal polymer (B) capable of forming the anisotropic molten phase with 0.01 to 1.0 part by weight of at least one compound (C) selected from the group consisting of phosphoric acid, phosphorous acid, and metal salts thereof.

Further, the present invention relates to an injection-molded article, wherein the liquid-crystal polymer (B) capable of forming the anisotropic molten phase is present in the state of fibers having an average aspect ratio of 6 or more in the matrix of the thermoplastic resin (A) not forming the anisotropic molten phase, which is obtained by injection-molding a thermoplastic resin composition comprising 100 parts by weight of the resin component consisting of the above (A) and (B) and 0.01 to 1.0 part by weight of at least one compound (C) selected from the group consisting of phosphoric acid, phosphorous acid, and metal salts thereof; or a method of producing an injection-molded article, wherein the liquid-crystal polymer (B) capable of forming the anisotropic molten phase is present in the state of fibers having an average aspect ratio of 6 or more in the matrix of the thermoplastic resin (A) not forming the anisotropic molten phase, which is obtained by mixing 100 parts by weight of the resin component consisting of the above (A) and (B) and 0.01 to 1.0 part by weight of at least one compound (C) selected from the group consisting of phosphoric acid, phosphorous acid, and metal salts thereof, and injection-molding the resultant thermoplastic resin composition,.

Preferably, the component (C) is at least one member selected from the metal salts of phosphoric acid and phosphorous acid. The metals are preferably elements selected from the group consisting of Group Ia and IIa elements of the Periodic Table, for example, lithium, sodium, potassium, magnesium, calcium, barium, and strontium. Especially, sodium, potassium and calcium are preferable.

The present invention provides a molded article having a superior mechanical strength to the conventional one since the liquid-crystal polymer having the form of fiber functions as a reinforcing material.

DETAILED DESCRIPTION OF THE INVENTION

Hereinafter, the constitution of the present invention will be described in detail.

Examples of the thermoplastic resin (A) not forming the anisotropic molten phase used in the present invention include polyolefin (co)polymer such as polyethylene, polypropylene and poly(4-methylpentene-1), polyester resin such as polyethylene terephthalate, polybutylene terephthalate and polycarbonate, polyamide resin, ABS resin, polyarylene sulfide resin, polyacrylarylate, polyacetal, polyphenylene oxide and a resin mainly comprising them. One or more of these resins may be used.

Among them, polyester resin such as polycarbonate resin and polybutylene terephthalate resin and polyarylene sulfide resin are preferable in respect of the thermal resistance, and the polycarbonate resin is especially preferable because it has relatively low molding shrinkage and linear expansion coefficient. Moreover, the effect of blending the component (C) is large in the polyester resins, especially in the polycarbonate resin.

The thermoplastic resin of the present invention includes one provided with desired properties by adding additives to the thermoplastic resin, for example, nucleating agent, pigment such as carbon black, antioxidant, stabilizer, plasticizer, lubricant, mold releasing agent and flame retardant.

Next, the liquid-crystal polymer (B) used in the present invention refers to a melt-processed polymer with the property that it can form an optically anisotropic molten phase.

The properties of an anisotropic molten phase can be confirmed by the conventional polarization inspection method using orthogonal polarizers. More specifically, confirmation of anisotropy in a molten phase can be attained by using a Leitz polarization microscope and observing a molten sample mounted on a Leitz hot stage under the nitrogen atmosphere at a magnification of 40 times. The polymer of the present invention exhibits an optical anisotropy wherein a polarized light penetrates even in a static molten phase, when observed between cross polarizers.

The liquid-crystal polymer suitably used in the present invention has a tendency to be substantially insoluble in a general solvent, and therefore, it is not suitable for solution processing. However, these polymers, as described above, can be easily processed by a general melt processing method.

As the liquid-crystal polymer usable in the present invention, aromatic polyester and aromatic polyester amide are preferable, and polyester partially containing aromatic polyester and aromatic polyester amide in the same molecular chain is also preferable.

Especially preferable is a liquid-crystal aromatic polyester or a liquid-crystal aromatic polyester amide containing at least one compound selected from the group consisting of aromatic hydroxylcarboxylic acid, aromatic hydroxylamine and aromatic diamine.

More specifically, the followings are cited:
1) polyester or polyester amide mainly comprising one or two or more of aromatic hydroxycarboxylic acid, aromatic aminocarboxylic acid and derivatives thereof;
2) polyester or polyester amide mainly comprising
   a) one or two or more of aromatic hydroxycarboxylic acid, aromatic aminocarboxylic acid and derivatives thereof,
   b) one or two or more of aromatic dicarboxylic acid, alicyclic dicarboxylic acid, aliphatic dicarboxylic acid and derivatives thereof, and
   c) one or two or more of aromatic diol, alicyclic diol, aliphatic diol and derivatives thereof;
3) polyester amide mainly comprising
   a) one or two or more of aromatic hydroxycarboxylic acid, aromatic aminocarboxylic acid and derivatives thereof,
   b) one or two or more of aromatic hydroxyamine, aromatic diamine and derivatives thereof, and
   c) one or two or more of aromatic dicarboxylic acid, alicyclic dicarboxylic acid, aliphatic dicarboxylic acid and derivatives thereof;
4) polyester amide mainly comprising
   a) one or two or more of aromatic hydroxycarboxylic acid, aromatic aminocarboxylic acid and derivatives thereof,
   b) one or two or more of aromatic hydroxyamine, aromatic diamine and derivatives thereof,
   c) one or two or more of aromatic dicarboxylic acid, alicyclic dicarboxylic acid, aliphatic dicarboxylic acid and derivatives thereof, and
   d) one or two or more of aromatic diol, alicyclic diol, aliphatic diol and derivatives thereof;
5) polyester or polyester amide mainly comprising
   a) one or two or more of aromatic hydroxycarboxylic acid, aromatic aminocarboxylic acid and derivatives thereof, and
   b) one or two or more of aromatic dicarboxylic acid, alicyclic dicarboxylic acid, aliphatic dicarboxylic acid and derivatives thereof; and
6) polyester or polyester amide mainly comprising
   a) one or two or more of aromatic hydroxycarboxylic acid, aromatic aminocarboxylic acid and derivatives thereof, and
   b) one or two or more of aromatic diol, alicyclic diol, aliphatic diol and derivatives thereof.

Furthermore, a molecular weight modifier may be used together with the above-mentioned components if necessary. Examples of the molecular weight modifier include a monofunctional component such as benzoic acid, phenol and p-phenylphenol.

Preferred examples of the concrete compounds constituting a liquid-crystal polymer of the present invention include:

aromatic hydroxycarboxylic acid such as p-hydroxybenzoic acid, m-hydroxybenzoic acid, 6-hydroxy-2-naphthoic acid, 7-hydroxy-2-naphthoic acid and 5-hydroxy-2-naphthoic acid;

aromatic aminocarboxylic acid such as p-amino benzoic acid and m-amino benzoic acid;

aromatic diol such as 2,6-dihydroxy naphthalene, 1,4-dihydroxy naphthalene, 1,5-dihydroxy naphthalene, 2,7-dihydroxy naphthalene, 4,4'-dihydroxy biphenyl, hydroquinone, resorcin and compounds represented by the following general formulas (I) or (II);

aliphatic diol represented by ethylene glycol and 1,4-butanediol;

aromatic dicarboxylic acid such as terephthalic acid, isophthalic acid, 4,4'-biphenyl dicarboxylic acid, 3,4'-biphenyl dicarboxylic acid, 2,6-naphthalene dicarboxylic acid, 2,7-naphthalene dicarboxylic acid, 1,4-naphthalene dicarboxylic acid, 1,5-naphthalene dicarboxylic acid and compounds represented by the following general formula (III); and aromatic diamine such as p-aminophenol, m-aminophenol, 1,4-phenylene diamine and 1,3-phenylene diamine;

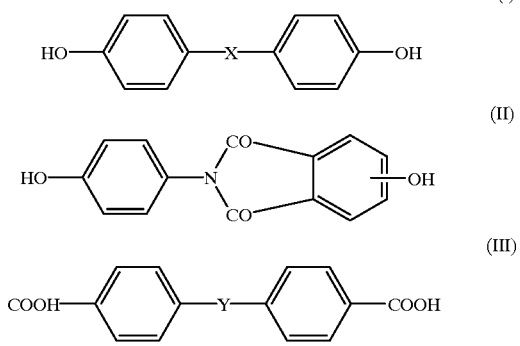

wherein X denotes a group selected from alkylene ($C_1$ to $C_4$), alkylydene, —O—, —SO—, —$SO_2$—, —S—, —CO—, and Y denotes a group selected from —$(CH_2)_n$— (in which n=1 to 4), —$O(CH_2)_n$ O(in which n=1 to 4).

Further, the liquid-crystal polyester used in the present invention may be a polyalkylene terephthalate which partially does not form an anisotropic molten phase in the same molecular chain, in addition to the aforementioned components. In this case, the number of carbons in the alkyl group is 2 to 4.

Among the above-described components, a further preferable example is one containing, as the essential component (s), one or two or more compounds selected from the group consisting of naphthalene compounds, biphenyl compounds and para-substituted benzene compounds. Among the p-substituted benzene compounds, p-hydroxy benzoic acid, methyl hydroquinone and 1-phenylethyl hydroquinone are especially preferred.

Examples of the compound having an ester formed functional group as the components and the polyester forming an anisotropic molten phase preferably used in the present invention are described in JP-B 63-36633.

The aromatic polyester and polyester amide described above generally show an inherent viscosity (I.V.) of at least about 2.0 dl/g, for example, about 2.0 to 10.0 dl/g when dissolved in pentafluorophenol with a concentration of 0.1 wt % at 60° C.

The amount of the liquid-crystal polymer (B) in the blend composition of the present invention is 1 to 50 parts by weight in the total 100 parts by weight of (B) and the thermoplastic resin (A) not forming an anisotropic molten phase.

In the present invention, it is effective that the liquid-crystal polymer (B) is preferably micro-dispersed beforehand in the matrix phase in order to form the liquid-crystal polymer (B) in the state of fibers having an average aspect ratio of 6 or more in the matrix phase during the injection molding and to improve the mechanical properties.

The effect of adding the compound (C) of the present invention is in that the compound (C) is highly effective as a dispersing assistant for micro-dispersing the liquid-crystal polymer (B) in the matrix phase and that the mechanical properties are largely enhanced as compared with the conventional phosphorus compound (phosphoric ester).

As the compound (C) of phosphoric acid, phosphorous acid and metal salts thereof used in the present invention, metaphosphoric acid, orthophosphoric acid, metaphosphate, orthophosphate and hydrogen orthophosphate are cited. As metals constituting the metal salts, Group Ia and IIa elements of the Periodic Table are preferable from the standpoint of the effect of blending. For example, metal salts such as sodium metaphosphate, sodium phosphate, monosodium phosphate, disodium phosphate, trisodium phosphate, monobasic calcium phosphate, dibasic calcium phosphate, tribasic calcium phosphate, mono-potassium phosphate, di-potassium phosphate and tri-potassium phosphate are preferably used.

Moreover, the component (C) is preferably a compound a 1% aqueous solution or slurry of which has a pH of 8 or lower. The reason why the pH of 8 or less is preferable is that the liquid-crystal polymer is generally weak at strongly alkaline substances and possibly causes a main chain decomposition according to the conditions of its concentration and temperature. When pH is 8 or less, there is a relatively small possibility of the decomposition.

The amount of the component (C) to be blended is 0.01 to 1.0 part by weight, preferably 0.03 to 0.2 part by weight, based on 100 parts by weight of the resin component comprising the components (A) and (B). When the blended amount is less than 0.01 part by weight, the effect of forming the liquid-crystal polymer into fibers during molding is reduced. When the blend amount exceeds 1.0 part by weight, the mechanical properties are deteriorated.

Further, addition of at least one silane compound (D) selected from the group consisting of vinylalkoxysilane, aminoalkoxysilane and mercaptoalkoxysilane is preferable in the present invention. By blending the component (D), an injection-molded article having little delamination on the surface can be obtained.

Examples of vinylalkoxysilane include vinyltriethoxysilane, vinyltrimethoxysilane and vinyltris(β-methoxyethoxy) silane. Examples of aminoalkoxysilane include γ-aminopropyltrimethoxysilane, -γaminopropyltriethoxysilane, γ-aminopropylmethyldimethoxysilane, γ-aminopropylmethyldimexysilane, N-(β-aminoethyl)-γ-aminopropyltrimethoxysilane, N-phenyl-γ-amonipropyltrimethoxysilane. Examples of mercaptoalkoxysilane include γ-mercaptopropyltrimethoxysilane, γ-mercaptopropyltriethoxysilane.

The amount of the component (D) to be blended is 0.01 to 3.0 parts by weight, preferably 0.03 to 1.5 parts by weight, based on 100 parts by weight of the resin component comprising the components (A) and (B). When the blended amount of the component (D) is less than 0.01 part by weight, the effect of improving delamination on the surface layer of the injection-molded article is hardly obtained. When the amount exceeds 3.0 parts by weight, elasticity modulus is deteriorated.

Additionally, the molded article of the blend composition of the present invention can be blended with various types of fibrous, powder and plate inorganic fillers according to the purposes of application.

Examples of fibrous fillers include inorganic fibrous substances such as glass fibers, asbestos fibers, silica fibers, silica/alumina fibers, alumina fibers, zirconia fibers, boron nitride fibers, silicon nitride fibers, boron fibers, potassium titanate fibers, and further, fibrous metals, e.g., stainless, aluminum, titanate, copper and brass.

Examples of powdery fillers include silicate such as carbon black, graphite, silica, quartz powders, glass beads, milled glass fibers, glass balloons, glass powders, calcium silicate, aluminum silicate, kaoline, talc, clay, diatom earth and wollastonite, metal oxide such as iron oxide, titanium oxide, zinc oxide, antinomy trioxide and alumina, metal carbonate such as calcium carbonate and magnesium carbonate, metal sulfate such as calcium sulfate and barium sulfate, and further, ferrite, silicon carbide, silicon nitride, boron nitride, and other various metal powders.

Examples of tabular fillers include mica, glass flakes, various metal foils and the like.

One or two or more types of these inorganic fillers can be used together.

Moreover, the inorganic fillers used in the present invention can be used in combination with a known surface treatment agent in accordance with desired physical properties. For example, functional compounds such as epoxy compounds, isocyanate compounds, titanate compounds and silane compounds are cited. Preferably, treatment is performed with the compounds other than amino compounds, such as epoxy compounds and polyamide compounds. These fillers may be used after surface treatment, or added at the same time of material preparation.

Herein, the amount of the inorganic fillers to be blended is preferably 1 to 50% by weight based on the total amount of the composition.

Moreover, the molded article may be flame-retarded by blending a flame retardant. As the flame retardant, organic halogen compounds and the like are used, but especially aromatic bromine compounds are preferable. Additionally, as a flame retardant assistant, metal oxide and hydroxide such as antimony trioxide, antimony halide, aluminum hydroxide and magnesium hydroxide are preferably used.

In this resin composition, LCP is preferably present as fibers having an average aspect ratio of 6 or more inside the molded article, especially preferably having the average aspect ratio of 8 or more. When the average aspect ratio is less than 6, a high strength and a high elasticity modulus as the characteristics of this resin composition cannot be obtained, and especially, a thin-film molded article for miniaturization and lightening cannot obtain a sufficient rigidity.

The composition of the present invention can generally be prepared by the equipment and methods used in preparing a synthetic resin composition. For example, there is a method of mixing necessary components, using a uniaxial or twin-screw extruder, kneading/extruding to prepare molding pellets and, subsequently, molding; a method of once preparing pellets having different compositions from one another, mixing a specific amount of the pellets to be subjected to molding, and obtaining a molded article having an intended composition; or the like. Namely, any method of preparing the composition before molding may be used, since LCP is formed into fibers during molding in the present invention. Additionally, LCP contained in PC is preferably molded at a temperature at which LCP flows by a shearing force during molding, especially at a temperature of a melting point of LCP or higher. When the temperature is the LCP's melting point or higher, the LCP's property of easy flow by the shearing force is utilized, and LCP can easily be formed into fibers by the shearing force.

EXAMPLES

Hereinafter, the present invention will be described in more detail with reference to the following examples, but the present invention is not limited to the examples.

Examples 1 to 4

0.06 part by weight of compound (C) shown in Table 1 was added to 100 parts by weight of a resin component obtained by blending a polybutylene terephthalate resin [manufactured by Polyplastics Co., Ltd., (IV=1.0)] and a liquid-crystal polymer (trade name; "Rodrun LC3000", manufactured by Unitika Ltd.) in a proportion shown in Table 1, and the mixture was molten/kneaded by a 30 mm twin-screw extruder at a resin temperature of 260° C. to prepare pellets. Subsequently, a test piece was made by injection-molding the pellets at a molding temperature of 260° C., and then, a flexural modulus, an Izod impact strength, fiber forming conditions and the peeling of surface layer were evaluated. Evaluation results are shown in Table 1.

Evaluation methods are as follows:
[Method of Measuring pH of Compound (C)]
100 ml of water was contained in a beaker having a capacity of 200 ml. After adding 1 g of the compound (C) thereto and stirring with a magnetic stirrer for five minutes, measurement was taken with a glass electrode pH meter.
[Flexural Modulus]
A flexural modulus (kg/cm$^2$) of a bending test piece having a thickness of 0.8 mm was measured according to ASTM D 790.
[Izod Impact Strength]
A notched impact strength (kg cm/cm) of an Izod test piece having a thickness of 6.4 mm was measured according to ASTM D 256.
[Average Aspect Ratio (length/thickness) of Fibrous Liquid-Crystal Polymer]
After the test piece used in the measurement of the flexural modulus was cut to expose a plane parallel with a fluidity direction, the cross section was mirror-polished, and its surface was observed by an electronic microscope to evaluate. That is, the length/thickness of each of 50 arbitrarily selected fibrous liquid-crystal polymers was measured to obtain an average value. An apparently observable length was measured as the length. As for results, an average aspect ratio of 6 or more is expressed as a circle, while an average aspect ratio of less than 6 as a cross.
[Test of Peeling Tape]
A test piece similar to one used in the measurement of flexural modulus was used, and an adhesive tape (having an area of 5 cm$^2$) was stuck on mainly around the gate of the specimen. The tape was peeled off at a constant rate, and an area of resin portion sticking to the adhesive tape was measured. As for results, a peel area of less than 0.5 cm$^2$ is expressed as a circle, a peel area of 0.5 to 1.0 cm$^2$ as a triangle, and an area of more than 1.0 cm$^2$ as a cross.

Comparative Examples 1 and 2

0.3 or 1.2 parts by weight of bis(2,6-di-t-butyl-4-methylphenyl)pentaerythritol-diphosphite was added as a phosphorus compound (phosphorous ester) to 100 parts by weight of a resin component comprising 70 parts by weight of a polybutylene terephthalate resin [manufactured by Polyplastics Co., Ltd., (IV=1.0)] and 30 parts by weight of a liquid-crystal polymer (trade name; "Rodrun LC3000", manufactured by Unitika Ltd.). Test pieces were prepared in the same manner as the above examples, and evaluated. Evaluation results are shown in Table 1.

Examples 5 and 6

0.06 part by weight of compound (C) shown in Table 1 and, further, 0.1 part by weight of γ-aminopropyl triethoxy silane were added to 100 parts by weight of a resin component comprising 70 parts by weight of a polybutylene terephthalate resin [manufactured by Polyplastics Co., Ltd., (IV=1.0)] and 30 parts by weight of a liquid-crystal polymer (trade name; "Rodrun LC3000", manufactured by Unitika Ltd.). Test pieces were prepared in the same manner as the above examples, and evaluated. Evaluation results are shown in Table 1.

Example 7

0.06 part by weight of compound (C) shown in Table 2 was added to 100 parts by weight of a resin component comprising 70 parts by weight of a polybutylene terephthalate resin [manufactured by Polyplastics Co., Ltd., (IV=1.0)] and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 2.

Comparative Example 3

0.3 part by weight of bis(2,6-di-t-butyl-4-methylphenyl) pentaerythritol-diphosphite was added as a phosphorus compound (phosphorous ester) to 100 parts by weight of a resin component comprising 70 parts by weight of a polybutylene terephthalate resin [manufactured by Polyplastics Co., Ltd., (IV=1.0)] and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 2.

Examples 8 to 12

0.06 part by weight of compound (C) shown in Table 3 was added to 100 parts by weight of a resin component comprising 70 parts by weight of a polycarbonate resin (trade name; "L1225", manufactured by Teijin Kasei Co., Ltd.) and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 3.

Comparative Example 4

Test pieces were prepared in the same manner as in the above examples, by using 70 parts by weight of a polycarbonate resin (trade name; "L1225", manufactured by Teijin Kasei Co., Ltd.) and 30 parts by weight of a liquid-crystal polymer (trade name; "Vectra A950", manufactured by Polyplastics Co., Ltd.), and evaluated. Evaluation results are shown in Table 3.

Comparative Example 5

1.5 parts by weight of compound (C) shown in Table 3 was added to 100 parts by weight of a resin component comprising 70 parts by weight of a polycarbonate resin (trade name; "L1225", manufactured by Teijin Kasei Co., Ltd.) and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 3.

Comparative Example 6

0.3 part by weight of bis(2,6-di-t-butyl-4-methylphenyl) pentaerythritol-diphosphite was added as a phosphorus compound (phosphorous ester) to 100 parts by weight of a resin component comprising 70 parts by weight of a polycarbonate resin (trade name; "L1225", manufactured by Teijin Kasei Co., Ltd.) and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 3.

Comparative Example 7

0.3 part by weight of barium stearate was added to 100 parts by weight of a resin component comprising 70 parts by weight of a polycarbonate resin (trade name; "L1225", manufactured by Teijin Kasei Co., Ltd.) and 30 parts by weight of a liquid-crystal polymer (trade name; "Vectra A950", manufactured by Polyplastics Co., Ltd.). Test pieces were prepared in the same manner as the above examples, and evaluated. Evaluation results are shown in Table 3.

Examples 13 to 20

The compound (C) shown in Table 4 was added in an amount shown in Table 4 to 100 parts by weight of a resin component obtained by blending a polycarbonate resin (trade name; "L1225", manufactured by Teijin Kasei Co., Ltd.) and a liquid-crystal polymer (trade name; "Vectra A950", manufactured by Polyplastics Co., Ltd.) in a proportion shown in Table 4, and further, 0.1 part by weight of γ-aminopropyl triethoxy silane was added thereto. Test pieces were prepared in the same manner as the above examples, and evaluated. Evaluation results are shown in Table 4.

TABLE 1

|  | Ex. 1 | Ex. 2 | Ex. 3 | Ex. 4 | Com. Ex. 1 | Com. Ex. 2 | Com. Ex. 5 | Com Ex. 6 |
|---|---|---|---|---|---|---|---|---|
| Thermoplastic resin (PBT) (parts by wt.) | 70 | 70 | 70 | 80 | 70 | 70 | 70 | 70 |
| Liquid-crystal polymer (parts by wt.) | 30 | 30 | 30 | 20 | 30 | 30 | 30 | 30 |

TABLE 1-continued

|  | Ex. 1 | Ex. 2 | Ex. 3 | Ex. 4 | Com. Ex. 1 | Com. Ex. 2 | Com. Ex. 5 | Com Ex. 6 |
|---|---|---|---|---|---|---|---|---|
| Compound (C) (type) | Monosodium phosphate | Monobasic calcium phosphate | Disodium phosphate | Monobasic calcium phosphate |  |  | Monosodium monobasic | Phosphate Calcium phosphate |
| (parts by weight) | 0.06 | 0.06 | 0.06 | 0.06 |  |  | 0.06 | 0.06 |
| pH of compound (C) | 4.5 | 4.3 | 9.5 | 4.3 |  |  | 4.5 | 4.3 |
| Phosphorus compound (parts by wt.) |  |  |  |  | 0.3 | 1.2 |  |  |
| Silane compound (parts by wt.) |  |  |  |  |  |  | 0.1 | 0.1 |
| 0.8 mmt flexural modulus (kg/cm$^2$) | 63000 | 65000 | 59000 | 51000 | 59000 | 56000 | 62000 | 64000 |
| Notched izod impact strength (kg cm/cm) | 3.1 | 2.9 | 2.9 | 4.0 | 2.1 | 2.0 | 3.1 | 3.1 |
| Liquid-crystal polymer formed into fibers | ◯ | ◯ | ◯ | ◯ | ◯ | ◯ | ◯ | ◯ |
| Peeling of surface layer | Δ | Δ | Δ | Δ | Δ | Δ | ◯ | ◯ |

TABLE 2

|  | Ex. 7 | Ex. 3 |
|---|---|---|
| Thermoplastic resin (PBT) (parts by wt.) | 70 | 70 |
| Liquid-crystal polymer (parts by wt.) | 30 | 30 |
| Compound (C) (type) | Monobasic calcium phosphate |  |
| (parts by weight) | 0.06 |  |
| pH of compound (C) | 4.3 |  |
| Phosphorus compound (parts by wt.) |  | 0.3 |
| Silane compound (parts by wt.) |  |  |
| 0.8 mmt flexural modulus (kg/cm$^2$) | 66000 | 63000 |
| Notched izod impact strength (kg cm/cm) | 3.2 | 2.1 |
| Liquid-crystal polymer formed into fibers | ◯ | ◯ |
| Peeling of surface layer | Δ | Δ |

TABLE 3

|  | Ex. 8 | Ex. 9 | Ex. 10 | Ex. 11 | Ex. 12 | Com. Ex. 4 | Com. Ex. 5 | Com. Ex. 6 | Com. Ex. 7 |
|---|---|---|---|---|---|---|---|---|---|
| Thermoplastic resin (PBT) (parts by wt.) | 70 | 70 | 70 | 70 | 70 | 70 | 70 | 70 | 70 |
| Liquid-crystal polymer (parts by wt.) | 30 | 30 | 30 | 20 | 30 | 30 | 30 | 30 | 30 |
| Compound (C) (type) | Phosphate | Phosphorous acid | Monosodium phosphate | Monobasic calcium phosphate | Disodium phosphate |  | Disodium phosphate |  | Barium stearate |
| (parts by weight) | 0.06 | 0.06 | 0.06 | 0.06 | 0.06 |  | 1.5 |  | 0.3 |
| pH of compound (C) | 3.1 | 2.5 | 4.5 | 4.3 | 9.5 |  | 9.5 |  | — |
| Phosphorus compound (parts by wt.) |  |  |  |  |  |  |  | 0.3 |  |
| Silane compound (parts by wt.) |  |  |  |  |  |  |  |  |  |
| 0.8 mmt flexural modulus (kg/cm$^2$) | 71000 | 72000 | 74000 | 75000 | 67000 | 31000 | 49000 | 66000 | 32000 |
| Notched izod impact strength (kg cm/cm) | 4.2 | 4.2 | 4.2 | 4.4 | 3.8 | 1.3 | 1.8 | 2.2 | 1.5 |
| Liquid-crystal polymer formed into fibers | ◯ | ◯ | ◯ | ◯ | ◯ | X | ◯ | ◯ | X |
| Peeling of surface layer | Δ | Δ | Δ | Δ | Δ | Δ | Δ | Δ | Δ |

TABLE 4

|  | Ex. 13 | Ex. 14 | Ex. 15 | Ex. 16 | Ex. 17 | Ex. 18 | Ex. 19 | Ex. 20 |
| --- | --- | --- | --- | --- | --- | --- | --- | --- |
| Thermoplastic resin (PBT) (parts by wt.) | 70 | 70 | 70 | 70 | 80 | 80 | 80 | 90 |
| Liquid-crystal polymer (parts by wt.) | 30 | 30 | 30 | 30 | 20 | 20 | 20 | 10 |
| Compound (C) (type) | Phosphate | Phosphorous acid | Monosodium phosphate | Monobasic calcium phosphate | Monobasic calcium phosphate | Monobasic calcium phosphate | Monobasic calcium phosphate | Monobasic calcium phosphate |
| (parts by weight) | 0.06 | 0.06 | 0.06 | 0.06 | 0.06 | 0.1 | 0.3 | 0.06 |
| pH of compound (C) | 3.1 | 2.5 | 4.5 | 4.3 | 4.3 | 4.3 | 4.3 | 4.3 |
| Phosphorus compound (parts by wt.) |  |  |  |  |  |  |  |  |
| Silane compound (parts by wt.) | 0.1 | 0.1 | 0.1 | 0.1 | 0.1 | 0.1 | 0.1 | 0.1 |
| 0.8 mmt flexural modulus (kg/cm$^2$) | 70000 | 70000 | 72000 | 75000 | 62000 | 65000 | 67000 | 46000 |
| Notched izod impact strength (kg cm/cm) | 4.3 | 4.3 | 4.3 | 4.4 | 5.0 | 5.1 | 5.1 | 7.8 |
| Liquid-crystal polymer formed into fibers | ○ | ○ | ○ | ○ | ○ | ○ | ○ | ○ |
| Peeling of surface layer | ○ | ○ | ○ | ○ | ○ | ○ | ○ | ○ |

What is claimed is:

1. An injection-molded article obtained by injection-molding a thermoplastic resin composition comprising 100 parts by weight of a resin component consisting of 99 to 50 parts by weight of a thermoplastic resin (A) not forming an anisotropic molten phase and 1 to 50 parts by weight of a liquid-crystal polymer (B) capable of forming an anisotropic molten phase, and 0.01 to 1.0 part by weight of at least one compound (C) selected from the group consisting of phosphoric acid, phosphorous acid and metal salts thereof, wherein the liquid-crystal polymer (B) capable of forming an anisotropic molten phase is present in the form of fiber having an average aspect ratio of 6 or higher in a matrix of the thermoplastic resin (A) not forming an anisotropic molten phase.

2. The injection-molded article as claimed in claim 1, wherein the metals constituting the metal salts of phosphoric acid or phosphorous acid of the component (C) are elements selected from the group consisting of Group Ia and IIa elements of the Periodic Table.

3. The injection-molded article as claimed in claim 1, wherein the component (C) is a compound a 1% aqueous solution or slurry of which has a pH of 8 or lower.

4. The injection-molded article as claimed in claim 1, wherein the thermoplastic resin (A) not forming an anisotropic molten phase is a polyester.

5. The injection-molded article as claimed in claim 1, wherein the thermoplastic resin (A) not forming an anisotropic molten phase is a polycarbonate resin.

6. The injection-molded article as claimed in claim 1, which further contains 0.01 to 3.0 parts by weight of at least one silane compound (D) selected from the group consisting of vinylalkoxysilane, amionoalkoxysilane and mercaptoalkoxysilane based on 100 parts by weight of the thermoplastic resin composition.

7. The injection-molded article as claimed in claim 1, wherein the component (C) is at least one member selected from metal salts of phosphoric acid and metal salts of phosphorous acid.

* * * * *